US012610036B2

(12) United States Patent
Yang et al.

(10) Patent No.: US 12,610,036 B2
(45) Date of Patent: Apr. 21, 2026

(54) HEAD-MOUNTED DISPLAY AND METHOD FOR EYE TRACKING CALIBRATION

(71) Applicant: HTC Corporation, Taoyuan City (TW)

(72) Inventors: Ching-Hao Yang, Taoyuan City (TW); Li-Chieh Pai, Taoyuan City (TW); Yan-Min Kuo, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 0 days.

(21) Appl. No.: 18/955,999

(22) Filed: Nov. 22, 2024

(65) Prior Publication Data

US 2025/0343888 A1     Nov. 6, 2025

Related U.S. Application Data

(60) Provisional application No. 63/641,940, filed on May 2, 2024.

(51) Int. Cl.
*H04N 13/327*     (2018.01)
*H04N 13/296*     (2018.01)
*H04N 13/383*     (2018.01)

(52) U.S. Cl.
CPC ......... *H04N 13/327* (2018.05); *H04N 13/296* (2018.05); *H04N 13/383* (2018.05)

(58) Field of Classification Search
CPC ... H04N 13/327; H04N 13/296; H04N 13/383
See application file for complete search history.

(56) References Cited

U.S. PATENT DOCUMENTS

2020/0388054 A1* 12/2020 Araújo ............... G02B 27/0093
2022/0342478 A1* 10/2022 El-Monajjed ........... G09G 3/02
2023/0102371 A1* 3/2023 Schonberg ......... G02B 27/0093
                                                            345/156

FOREIGN PATENT DOCUMENTS

TW        202101976        1/2021
TW        202310618        3/2023

OTHER PUBLICATIONS

"Office Action of Taiwan Counterpart Application", issued on Jul. 1, 2025, p. 1-p. 6.

* cited by examiner

*Primary Examiner* — Richard T Torrente
(74) *Attorney, Agent, or Firm* — JCIPRNET

(57)     ABSTRACT

A head-mounted display and a method for eye tracking calibration are provided. The head-mounted display includes a display, an image capture device, and a processor. The image capture device captures an eye image during a display of calibration points. The processor is coupled to the display and the image capture device, wherein the processor is configured to: display the calibration points on positions of a position set sequentially in an order according to a current time and number of positions via the display; and generate calibration data according to the eye image.

8 Claims, 4 Drawing Sheets

100

Display calibration points on positions of a position set sequentially in an order via a display by a head-mounted display —S401

Capture an eye image by the head-mounted display during a display of the calibration points —S402

Generate calibration data according to the eye image by the head-mounted display —S403

HEAD-MOUNTED DISPLAY AND METHOD FOR EYE TRACKING CALIBRATION

CROSS-REFERENCE TO RELATED APPLICATION

This application claims the priority benefit of U.S. provisional application Ser. No. 63/641,940, filed on May 2, 2024. The entirety of the above-mentioned patent application is hereby incorporated by reference herein and made a part of this specification.

BACKGROUND OF THE INVENTION

Field of the Invention

The invention relates to an extended reality (XR) technique, and in particular to a head-mounted display and a method for eye tracking calibration.

Description of Related Art

In the development of metaverse-related techniques, the eye tracking system has become one of the basic equipment of the XR system. The XR system may perform eye tracking on a user wearing a head-mounted display (HMD) to interact with the user. In order to adapt the HMD to users with different eye characteristics, the HMD may perform a calibration function before performing eye tracking. A traditional HMD displays a plurality of calibration points in a fixed pattern. The HMD may perform calibration of eye tracking according to the eye characteristics when the user is looking at the calibration points. However, a user with HMD experience may be able to predict the position, order, or frequency of the calibration points. This anticipatory psychology may affect the eye movements of the user during calibration, causing the data collected by the HMD to be incorrect. Accordingly, the calibration results may not be ideal. Based on the above, how to correctly perform the calibration of the eye tracking system is one of the important issues in the art.

SUMMARY OF THE INVENTION

The invention provides a head-mounted display and method for eye tracking calibration that may improve the accuracy of data used for eye tracking calibration.

A head-mounted display for eye tracking calibration includes a display, an image capture device, and a processor. The image capture device captures an eye image during a display of calibration points. The processor is coupled to the display and the image capture device, wherein the processor is configured to: display the calibration points on positions of a position set sequentially in an order according to a current time and number of positions via the display; and generate calibration data according to the eye image.

In an embodiment of the invention, the current time includes a system clock or a gazing time on a previous calibration point.

In an embodiment of the invention, each of the positions of the position set is preset with a value.

In an embodiment of the invention, the processor is further configured to: divide the current time by remaining number of positions to obtain a remainder; and display the calibration point on the position with the value corresponding to the remainder.

In an embodiment of the invention, the processor is further configured to: divide the current time by the remaining number of positions to obtain the remainder in response to the remaining number of positions being greater than zero.

In an embodiment of the invention, the processor is further configured to: stop the display of the calibration point in response to the remaining number of positions equaling zero.

A method for eye tracking calibration of the invention includes: displaying calibration points on positions of a position set sequentially in an order according to a current time and number of positions via a display by a head-mounted display; capturing an eye image by the head-mounted display during a display of the calibration points; and generating calibration data according to the eye image by the head-mounted display.

In an embodiment of the invention, the current time includes a system clock or a gazing time on a previous calibration point.

In an embodiment of the invention, each of the positions of the position set is preset with a value.

In an embodiment of the invention, the step of displaying the calibration points on the positions of the position set sequentially in the order according to the current time and the number of positions includes: dividing the current time by remaining number of positions to obtain a remainder; and displaying the calibration point on the position with the value corresponding to the remainder.

In an embodiment of the invention, the step of dividing the current time by the remaining number of positions to obtain the remainder includes: dividing the current time by the remaining number of positions to obtain the remainder in response to the remaining number of positions being greater than zero.

In an embodiment of the invention, the method further including: stopping displaying the calibration point in response to the remaining number of positions equaling zero.

Based on the above, in the invention, the calibration points may be displayed in a random manner during the calibration of eye tracking. In the invention, the user may be prevented from predicting the position, order, or frequency of the calibration points, making the calibration results of eye tracking more accurate.

DESCRIPTION OF THE EMBODIMENTS

Figure 1:
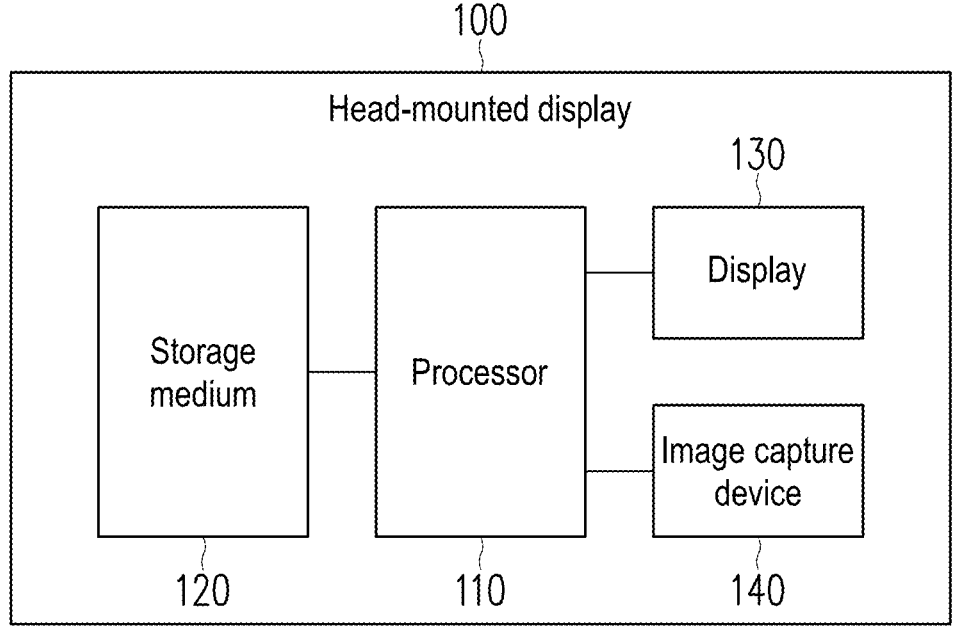
FIG. 1 shows a schematic diagram of a head-mounted display for eye tracking calibration according to an embodiment of the invention.

FIG. 1 shows a schematic diagram of a head-mounted display 100 for eye tracking calibration according to an embodiment of the invention. The head-mounted display 100 may include a processor 110, a storage medium 120, a display 130, and an image capture device 140. The head-mounted display 100 may be worn on the head of the user, and may provide the user with an XR environment or XR scene, such as a virtual reality (VR) environment, an augmented reality (AR) environment, or a mixed reality (MR) environment.

The processor 110 is, for example, a central processing unit (CPU), or other programmable general-purpose or special-purpose micro control unit (MCU), microprocessor, digital signal processor (DSP), programmable controller, application-specific integrated circuit (ASIC), graphics processing unit (GPU), image signal processor (ISP), image processing unit (IPU), arithmetic logic unit (ALU), complex programmable logic device (CPLD), field-programmable gate array (FPGA), or other similar elements, or a combination of the above elements. The processor 110 may be coupled to the storage medium 120, the display 130, and the image capture device 140, and access and execute a plurality of modules and various applications in the storage medium 120.

The storage medium 120 is, for example, any type of fixed or removable random-access memory (RAM), read-only memory (ROM), flash memory, hard-disk drive (HDD), solid-state drive (SSD), or similar elements, or a combination of the above elements, and is used to store a plurality of modules or various applications that may be executed by the processor 110.

The display 130 may include a liquid-crystal display (LCD) or an organic light-emitting diode (OLED) display. In an embodiment, the display 130 may provide an image beam to the eyes of the user to form an image on the retina of the user, so that the user may see the XR scene created by the HMD.

The image capture device 140 is, for example, a camera used to capture an image. The image capture device 140 may include a photosensitive element such as a complementary metal oxide semiconductor (CMOS) or a charge coupled device (CCD). The image capture device 140 may be used to capture an eye image of the user wearing the head-mounted display 100. The processor 110 may perform eye tracking according to the eye image of the user. The head-mounted display 100 may interact with the user according to the results of eye tracking. For example, when the user looks at a virtual object of a virtual scene, the head-mounted display 100 may determine that the user is looking at the virtual object according to the results of eye tracking, and interact with the user using the virtual object.

Figure 2:
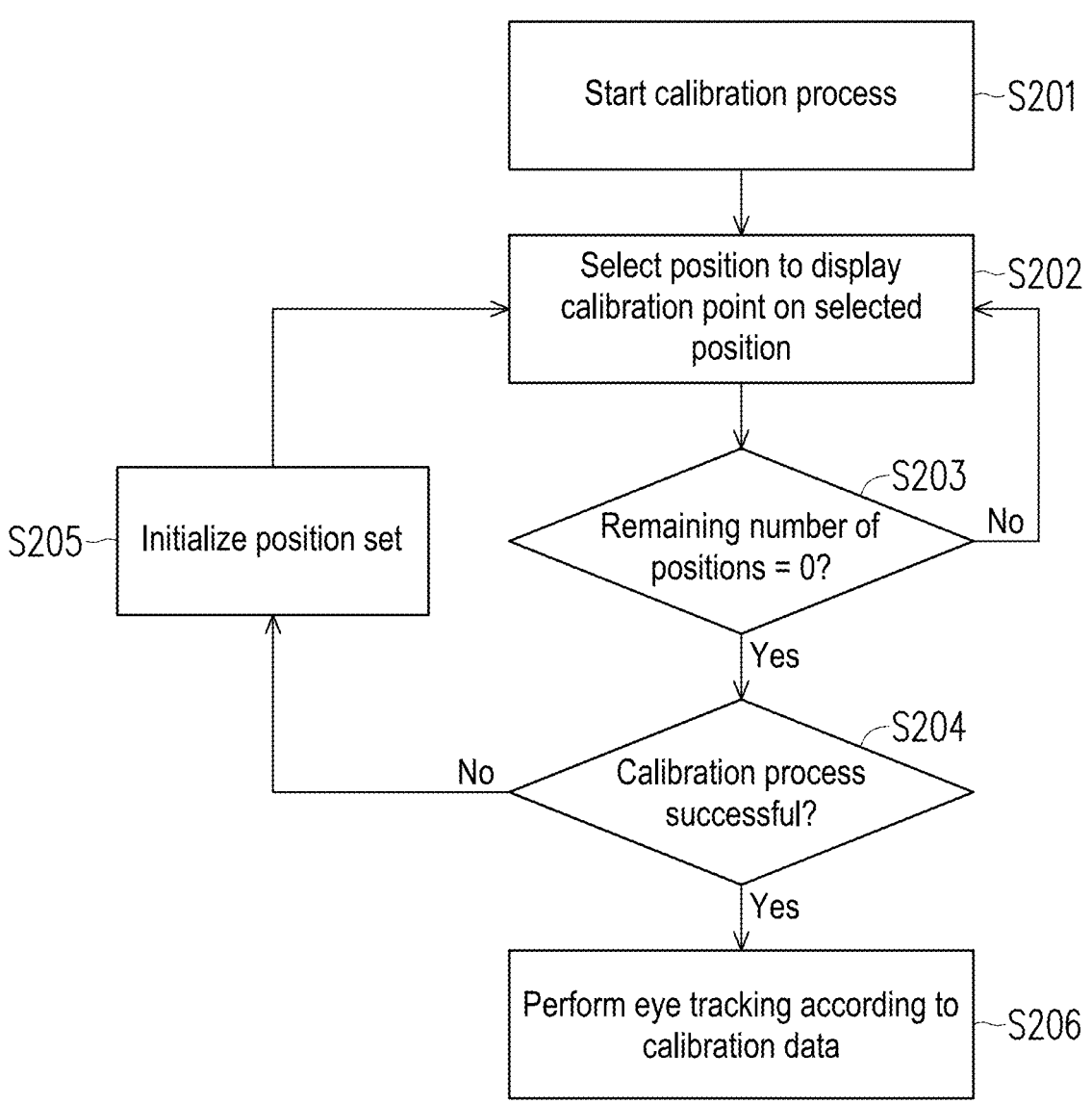
FIG. 2 shows a flowchart of a method of calibrating an eye tracking function according to an embodiment of the invention.

FIG. 2 shows a flowchart of a method of calibrating an eye-tracking function according to an embodiment of the invention, wherein the method may be implemented by the head-mounted display 100 shown in FIG. 1. In step S201, after the user wears the head-mounted display 100 on the head, the processor 110 may start to perform a calibration process of eye tracking. The calibration process may be initiated manually by the user or initiated automatically by the processor 110. For example, the processor 110 may be communicatively connected to an input device (e.g., a handheld controller or the image capture device 140). The user may perform the calibration process by operating the head-mounted display 100 using an input device. As another example, the processor 110 may start performing the calibration process after the head-mounted display 100 is started or after the head-mounted display 100 is worn on the head of the user. In an embodiment, the processor 110 may be coupled to an inertial measurement unit, and may determine whether the head-mounted display 100 is worn on the head of the user according to the measurement result of the inertial measurement unit. After the calibration process is started, the processor 110 may display the calibration points on positions of a position set sequentially in an order via the display 130, where the position set may include a plurality of positions.

In step S202, the processor 110 may select a position from the position set and display the calibration point on the selected position via the display 130. After the calibration point is displayed on the selected position, the processor 110 may remove the selected position from the position set to update the position set. That is, the remaining number of positions in the position set may be reduced after step S202.

During the display of the calibration point by the display 130, the processor 110 may capture the eye image of the user via the image capture device 140.

Figure 3:
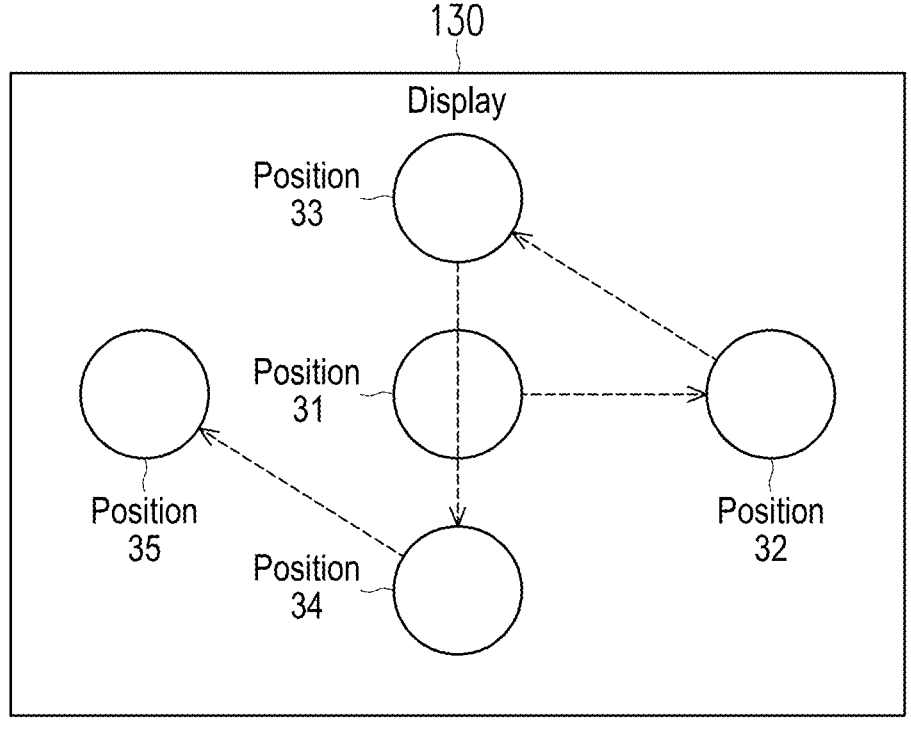
FIG. 3 shows a schematic diagram of a display and a position set according to an embodiment of the invention.

FIG. 3 shows a schematic diagram of the display 130 and a position set according to an embodiment of the invention. Taking FIG. 3 as an example, the position set may include a position 31, a position 32, a position 33, a position 34, and a position 35. In step S202, the processor 110 may select the position 31 from the five positions as the selected position, thereby displaying the calibration point on the position 31 via the display 130. Next, the processor 110 may remove the position 31 from the position set to update the position set. That is, the updated position set may include the position 32, the position 33, the position 34, and the position 35. During the display of the calibration point on the position 31 via the display 130, the processor 110 may capture the eye image of the user via the image capture device 140, wherein the eye image may include eye characteristics when the user is looking at the position 31.

In an embodiment, the processor 110 may select a selected position from the position set according to the current time and the number of positions of the position set, and display the calibration point on the selected position. Specifically, each of the positions of the position set may be preset with a value by the processor 110, wherein the values of the positions may be different from each other. The processor 110 may obtain a number N of positions in the position set, wherein N is a non-negative integer (i.e., N may be the remaining number of positions of the position set). The processor 110 may divide the current time by N to obtain the remainder (i.e., the processor 110 may perform an operation of dividing the current time by N). The processor 110 may select one of the positions from the position set as the selected position according to the remainder, wherein the selected position is with the value corresponding to the remainder. For example, assume that position 31 is preset with a value '1', position 32 is preset with a value '2', position 33 is preset with a value '3', position 34 is preset with a value '4', and position 35 is preset with a value '5'. If the current time is equal to '11', the processor 110 may divide the current time '11' by 'N=5' to obtain the remainder '1'. Since position 31 is with the value '1' corresponding to the remainder '1', the processor 110 may select position 31 from the position set to be the selected position. Position 31 may be removed from the position set and N may be reduced to 4.

In an embodiment of the present invention, the processor 110 may determine the current time according to the system clock. For example, if the system clock includes '11 seconds', the processor 110 may determine that the current time is '11'. In an embodiment of the present invention, the processor 110 may determine the current time according to a gazing time on a previous calibration point. Assume that a previous calibration point was displayed on position 31 during a specific time period. After the previous calibration point on position 31 is vanished and position 31 is removed from the position set, the processor 110 may select one position from the remaining positions of the position set according to the specific time period. For example, if the specific time period is '10:50:50 to 10:50:58', the processor 110 may determine that the current time is equal to '58', which corresponds to the end second of the specific time period.

In step S203, the processor 110 may determine whether the remaining number of positions in the position set is zero. If the remaining number of positions is zero, the processor 110 may perform step S204 and may stop displaying the calibration point. If the remaining number of positions is greater than zero, the processor 110 may perform step S202 again. That is, the processor 110 may select a position from the updated position set as the selected position, and display the calibration point on the selected position via the display 130.

Taking FIG. 3 as an example, the processor 110 may iteratively perform step S202 and step S203 to sequentially display the calibration point on each position according to the order of the position 31, the position 32, the position 33, the position 34, and the position 35.

In step S204, the processor 110 may generate calibration data for eye tracking according to a plurality of eye images corresponding to a plurality of positions (e.g., the position 31, the position 32, the position 33, the position 34, and the position 35) in the initial position set. Then, the processor 110 may determine whether the eye tracking calibration process is successful according to the calibration data. The processor 110 may determine whether the calibration process is successful according to any algorithm or rule, which is not limited by the invention. If the processor 110 determines that the calibration process is successful, step S206 is performed. If the processor 110 determines that the calibration process fails, step S205 is performed.

In step S205, the processor 110 may initialize the position set. For example, the processor 110 may convert the position set from an empty set to a set containing the position 31, the position 32, the position 33, the position 34, and the position 35. After step S205 is completed, the processor 110 may perform step S202 again to attempt the calibration of eye tracking again.

In step S206, the processor 110 may perform eye tracking according to the calibration data.

Figure 4:
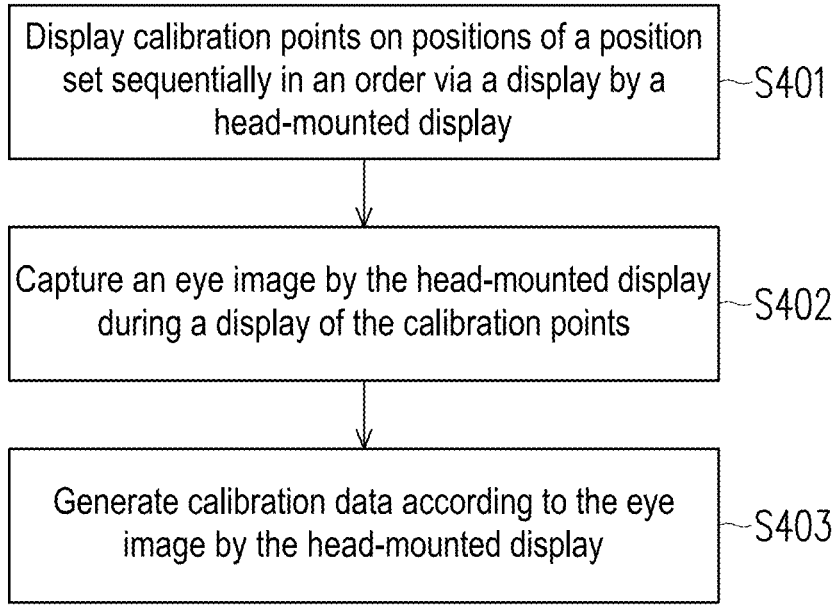
FIG. 4 shows a flowchart of a method for eye tracking calibration according to an embodiment of the invention.

FIG. 4 shows a flowchart of a method for eye tracking calibration according to an embodiment of the invention, wherein the method may be implemented by the head-mounted display 100 shown in FIG. 1. In step S401, calibration points are displayed on positions of a position set sequentially in an order according to a current time and number of positions via a display by a head-mounted display. In step S402, during a display of the calibration points, an eye image is captured by the head-mounted display. In step S403, calibration data is generated according to the eye image by the head-mounted display.

Based on the above, the head-mounted display of the invention may display calibration points on different positions of the display sequentially in a random order. Users of the head-mounted display are not able to predict the position, order, or frequency of the calibration points according to past experience. Compared with traditional eye tracking calibration methods, the calibration data collected based on the method of the invention is more accurate. The accuracy of eye tracking performed based on the calibration data may be significantly improved.

What is claimed is:

1. A head-mounted display for eye tracking calibration, comprising:
   a display;
   an image capture device, capturing an eye image during a display of calibration points; and
   a processor coupled to the display and the image capture device, wherein the processor is configured to:
      display the calibration points on positions of a position set sequentially in an order according to a current time and number of positions via the display; and
      generate calibration data according to the eye image, wherein each of the positions of the position set is preset with a value,
      wherein the processor is further configured to:
         divide the current time by remaining number of positions to obtain a remainder; and
         display the calibration point on the position with the value corresponding to the remainder.

2. The head-mounted display of claim 1, wherein the current time comprises a system clock or a gazing time on a previous calibration point.

3. The head-mounted display of claim 1, wherein the processor is further configured to:
   divide the current time by the remaining number of positions to obtain the remainder in response to the remaining number of positions being greater than zero.

4. The head-mounted display of claim 1, wherein the processor is further configured to:
   stop the display of the calibration point in response to the remaining number of positions equaling zero.

5. A method for eye tracking calibration, comprising:
   displaying calibration points on positions of a position set sequentially in an order according to a current time and number of positions via a display by a head-mounted display;
   capturing an eye image by the head-mounted display during a display of the calibration points; and
   generating calibration data according to the eye image by the head-mounted display,
   wherein each of the positions of the position set is preset with a value,
   wherein the step of displaying the calibration points on the positions of the position set sequentially in the order according to the current time and the number of positions comprises:
      dividing the current time by remaining number of positions to obtain a remainder; and
      displaying the calibration point on the position with the value corresponding to the remainder.

6. The method of claim 5, wherein the current time comprises a system clock or a gazing time on a previous calibration point.

7. The method of claim 5, wherein the step of dividing the current time by the remaining number of positions to obtain the remainder comprises:
   dividing the current time by the remaining number of positions to obtain the remainder in response to the remaining number of positions being greater than zero.

8. The method of claim 5, further comprising:
   stopping displaying the calibration point in response to the remaining number of positions equaling zero.

* * * * *